(12) United States Patent
Moriya et al.

(10) Patent No.: US 10,449,873 B2
(45) Date of Patent: Oct. 22, 2019

(54) COOLING APPARATUS FOR IN-VEHICLE DEVICE

(71) Applicant: SUBARU CORPORATION, Tokyo (JP)

(72) Inventors: Fumiyuki Moriya, Tokyo (JP); Yuichi Tanaka, Tokyo (JP); Hiroshi Ienaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/052,786

(22) Filed: Aug. 2, 2018

(65) Prior Publication Data

US 2019/0077274 A1 Mar. 14, 2019

(30) Foreign Application Priority Data

Sep. 8, 2017 (JP) .................................. 2017-172588

(51) Int. Cl.
*B60L 58/26* (2019.01)
*B60W 20/15* (2016.01)
*B60W 20/17* (2016.01)

(52) U.S. Cl.
CPC ............ *B60L 58/26* (2019.02); *B60W 20/15* (2016.01); *B60W 20/17* (2016.01); *B60L 2240/36* (2013.01); *B60L 2240/68* (2013.01)

(58) Field of Classification Search
None
See application file for complete search history.

(56) References Cited

U.S. PATENT DOCUMENTS

| 7,793,746 B2* | 9/2010 | Maier ................. B60K 11/02 180/65.31 |
| 2009/0024252 A1* | 1/2009 | Aridome ............... B60K 6/445 700/275 |
| 2010/0241308 A1* | 9/2010 | Kikuchi ............ B60H 1/00278 701/36 |
| 2014/0245974 A1* | 9/2014 | Elsarrag ................ F01N 5/025 123/3 |
| 2018/0022210 A1 | 1/2018 | Matsumura |

FOREIGN PATENT DOCUMENTS

| JP | 2003-178815 A | 6/2003 |
| JP | 2004-162542 A | 6/2004 |
| JP | 2016-7990 A | 1/2016 |
| WO | 2016/129096 A1 | 8/2016 |

* cited by examiner

*Primary Examiner* — Lail A Kleinman
(74) *Attorney, Agent, or Firm* — Troutman Sanders LLP

(57) ABSTRACT

A cooling apparatus for an in-vehicle device includes a cooler, a traffic congestion determining unit, a cooling amount calculator, and a cooler controller. The cooling amount calculator calculates first and second cooling amounts respectively based on a heat-generation amount of a heat-generating device and a noise level inside a vehicle. The cooler controller controls the cooler on the basis of a set cooling amount. The cooler controller controls the cooler to cool the heat-generating device on the basis of the set cooling amount larger than the first cooling amount and equal to or smaller than the second cooling amount and limits a decrease rate of the set cooling amount to be smaller than an increase rate of the set cooling amount, on a condition that the traveling road is determined by the traffic congestion determining unit as being congested and the first cooling amount is smaller than the second cooling amount.

17 Claims, 4 Drawing Sheets

COOLING APPARATUS FOR IN-VEHICLE DEVICE

CROSS-REFERENCE TO RELATED APPLICATIONS

The present application claims priority from Japanese Patent Application No. 2017-172588 filed on Sep. 8, 2017, the entire contents of which are hereby incorporated by reference.

BACKGROUND

The technology relates to a cooling apparatus for an in-vehicle device that cools a heat-generating device mounted on a vehicle. In particular, the technology relates to a cooling apparatus for an in-vehicle device useful for suitably cooling the heat-generating device when a road on which the vehicle travels is congested.

In recent years, an electric vehicle becomes popular which is mounted with a battery and which travels by driving, with electric power stored in the battery, a motor directed to traveling. Non-limiting examples of the electric vehicle may include an EV (Electric Vehicle) or an HEV (Hybrid Electric Vehicle).

Such an electric vehicle includes a cooling device that cools the battery, and performs a cooling control that is based on a load on the battery and/or based on an ambient temperature.

Here, for example, in a case where a cooling fan is adopted as the cooling device, it is necessary to increase a rotation speed of the cooling fan in order to increase cooling intensity. This causes a noise such as a wind noise to become larger with the increase in the rotation speed. For that reason, to prevent the noise from becoming larger than a vehicle interior noise and thereby to prevent an occupant from experiencing a sense of discomfort, it is necessary to appropriately control the rotation speed of the cooling fan. Non-limiting examples of the vehicle interior noise may include an engine sound and a road noise. For example, reference is made to Japanese Unexamined Patent Application Publication No. 2016-7990 and Japanese Unexamined Patent Application Publication No. 2003-178815.

SUMMARY

An aspect of the technology provides a cooling apparatus for an in-vehicle device that includes: a cooler configured to generate an operating noise with loudness that is based on an output of the cooler, and cool a heat-generating device mounted on a vehicle; a traffic congestion determining unit configured to determine, on a basis of a traveling state of the vehicle, whether a traveling road on which the vehicle travels is congested; a cooling amount calculator configured to calculate a first cooling amount and a second cooling amount, in which the first cooling amount is based on a heat-generation amount of the heat-generating device, and the second cooling amount is based on a noise level inside the vehicle; and a cooler controller configured to control an operation of the cooler on a basis of a set cooling amount. The cooler controller is configured to control the cooler to cool the heat-generating device on a basis of the set cooling amount that is larger than the first cooling amount and equal to or smaller than the second cooling amount and limit a rate of decrease in the set cooling amount to be smaller than a rate of increase in the set cooling amount, on a condition that the traveling road is determined by the traffic congestion determining unit as being congested and the first cooling amount is smaller than the second cooling amount.

An aspect of the technology provides a cooling apparatus for an in-vehicle device that includes: a cooler configured to generate an operating noise with loudness that is based on an output of the cooler, and cool a heat-generating device mounted on a vehicle; and circuitry configured to determine, on a basis of a traveling state of the vehicle, whether a traveling road on which the vehicle travels is congested, calculate a first cooling amount and a second cooling amount, in which the first cooling amount is based on a heat-generation amount of the heat-generating device, and the second cooling amount is based on a noise level inside the vehicle, control an operation of the cooler on a basis of a set cooling amount, control the cooler to cool the heat-generating device on a basis of the set cooling amount that is larger than the first cooling amount and equal to or smaller than the second cooling amount, on a condition that the traveling road is determined as being congested and the first cooling amount is smaller than the second cooling amount, and limit a rate of decrease in the set cooling amount to be smaller than a rate of increase in the set cooling amount, on the condition that the traveling road is determined as being congested and the first cooling amount is smaller than the second cooling amount.

DETAILED DESCRIPTION

Figure 1:
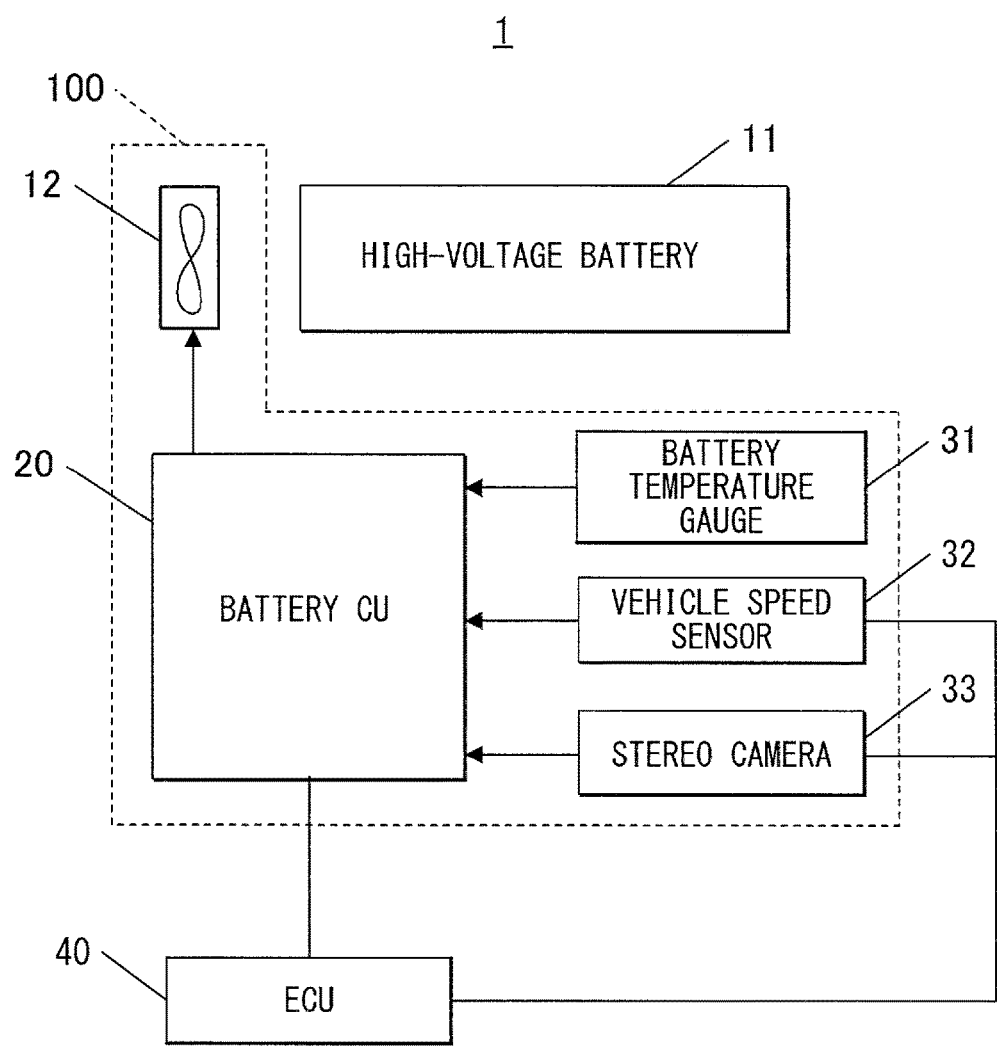
FIG. 1 is a block diagram illustrating a schematic configuration of a vehicle provided with a cooling apparatus for an in-vehicle device according to one implementation.

In the following, some non-limiting implementations of the technology are described in detail with reference to the accompanying drawings.

Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

At the time of a low vehicle speed in which a vehicle interior noise becomes smaller, it is easy to give a sense of discomfort to an occupant due to a noise resulting from an increase in a rotation speed of a cooling fan. In particular, upon traffic congestion, a load on a battery becomes higher due to repeated start and stop of a vehicle at the low vehicle speed, which requires stronger cooling intensity.

Figure 5:
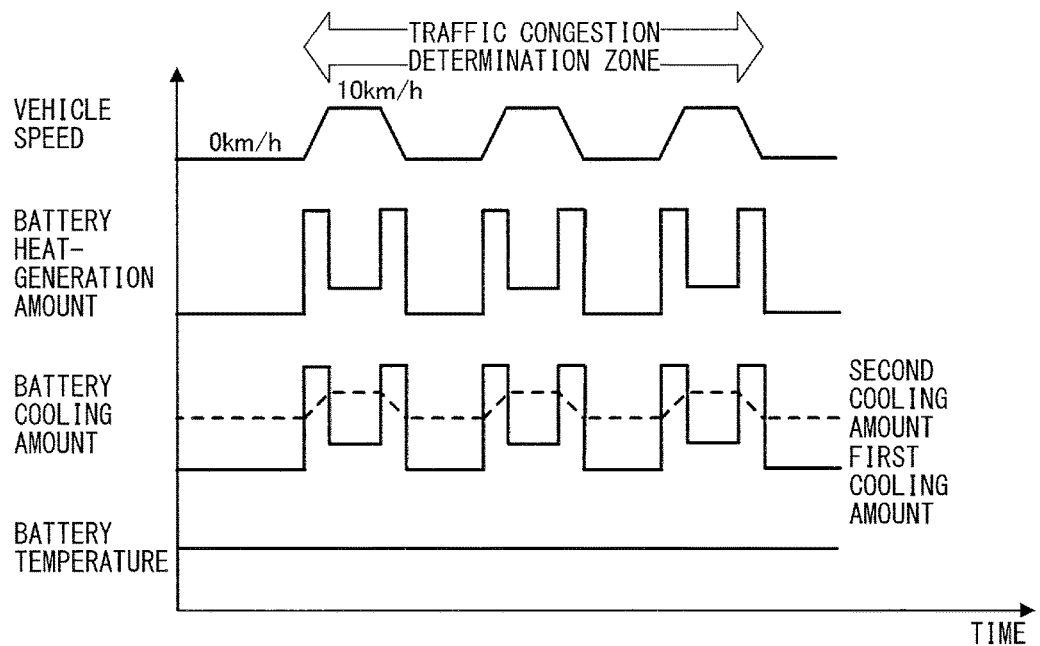
FIG. 5 is a view illustrating one example of a timing chart of a vehicle speed, a battery heat-generation amount, a battery cooling amount, and a battery temperature upon traffic congestion in a comparative example.

A comparative example where the cooling intensity is simply heightened in accordance with the load on the battery (that is, a heat-generation amount thereof) upon the traffic congestion is described with reference to FIG. 5. In this comparative example, a set cooling amount of the battery is set to a cooling amount that is based on the heat-generation amount of the battery (e.g., a first cooling amount). In this case, the first cooling amount easily becomes larger than a cooling amount that involves a noise level that does not give a sense of discomfort to an occupant (e.g., a second cooling amount) as illustrated in FIG. 5.

Figure 6:
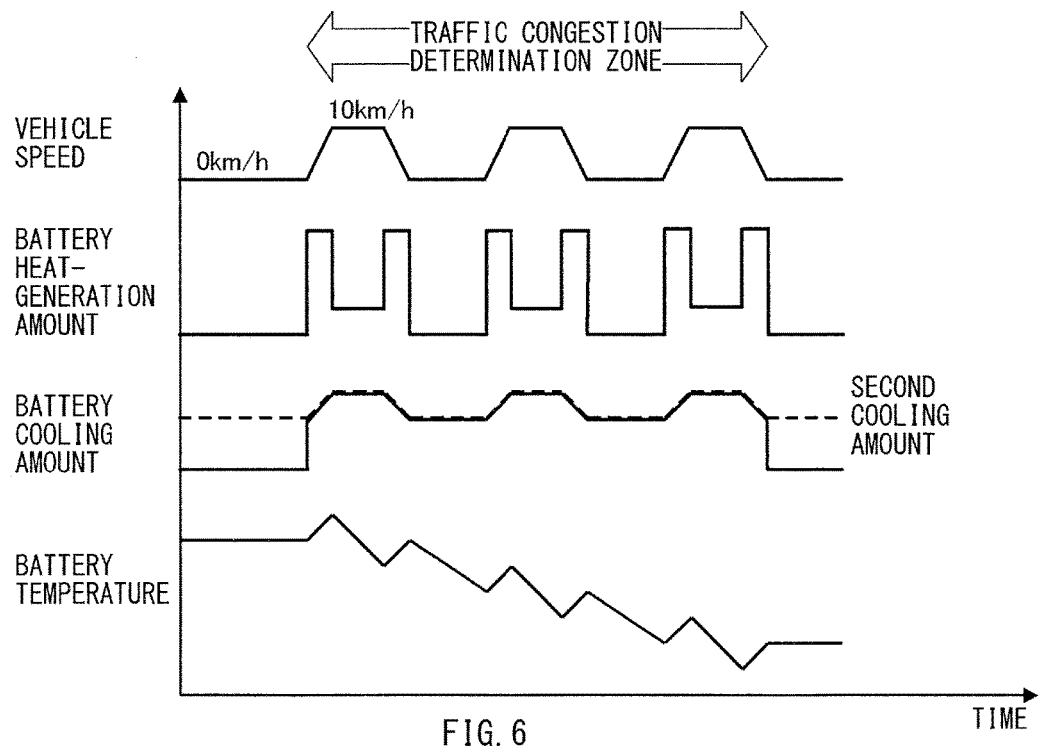
FIG. 6 is a view illustrating another example of the timing chart of a vehicle speed, a battery heat-generation amount, a battery cooling amount, and a battery temperature upon the traffic congestion in the comparative example.

To address this, as illustrated in FIG. 6, one measure may possibly be to cool the battery constantly during the traffic congestion by the second cooling amount as the set cooling amount, regardless of the heat-generation amount of the battery. The second cooling amount is a cooling amount tolerable in terms of noise.

However, in this case, the battery may possibly be cooled excessively upon steady traveling at the low vehicle speed or stop of the vehicle where the load on the battery is not high. This may possibly cause deterioration in fuel consumption of the vehicle.

It is desirable to provide a cooling apparatus for an in-vehicle device that suitably cools a heat-generating device upon traffic congestion while keeping quietness in a vehicle.

Configuration of Cooling Apparatus for in-Vehicle Device

A configuration of a cooling apparatus for an in-vehicle device (hereinafter, referred to as an "in-vehicle device cooling apparatus") 100 according to an example implementation is described with reference to FIG. 1.

FIG. 1 is a block diagram illustrating a schematic configuration of a vehicle 1 provided with the in-vehicle device cooling apparatus 100 according to an example implementation.

Referring to FIG. 1, the vehicle 1 according to the example implementation may be an electric vehicle such as an EV (Electric Vehicle) or a PHEV (Plug-in Hybrid Electric Vehicle).

For example, the vehicle 1 may include a high-voltage battery 11, a cooling fan 12, a battery CU (Control Unit) 20, a group of sensors (e.g., a battery temperature gauge 31, a vehicle speed sensor 32, and a stereo camera 33), and an ECU (Electronic Control Unit) 40. In one implementation, the cooling fan 12 may serve as a "cooler". In one implementation, the battery CU 20 may serve as a "cooler controller".

The in-vehicle device cooling apparatus 100 according to the example implementation may be mounted on the vehicle 1 and cools the high-voltage battery 11. The in-vehicle device cooling apparatus 100 allows for cooling of the high-voltage battery 11 silently, especially upon traffic congestion. For example, the in-vehicle device cooling apparatus 100 may include the cooling fan 12, the battery CU 20, and the group of sensors (e.g., the battery temperature gauge 31, the vehicle speed sensor 32, and the stereo camera 33).

The high-voltage battery 11 may be a secondary battery such as a nickel metal hydride battery or a lithium-ion battery, for example. The high-voltage battery 11 may store electric power directed to traveling of the vehicle 1, and supply the electric power to an unillustrated motor when the vehicle 1 travels.

The cooling fan 12 cools the high-voltage battery 11. The cooling fan 12 generates an operating noise with loudness that is based on an output thereof.

The battery CU 20 controls an operation of the high-voltage battery 11. The battery CU 20 may also control and operation of each component in the in-vehicle device cooling apparatus 100. For example, the battery CU 20 may control charge and discharge of the high-voltage battery 11. The battery CU 20 may also control an operation of the cooling fan 12 on the basis of, for example, input signals outputted from the group of sensors.

In the example implementation, the group of sensors may at least include a battery temperature gauge 31, a vehicle speed sensor 32, and a stereo camera 33.

The battery temperature gauge 31 may detect an ambient temperature of the high-voltage battery 11, and output data on the detected ambient temperature to the battery CU 20. Note that the battery temperature gauge 31 may detect a temperature inside the high-voltage battery 11 directly in an alternative implementation.

The vehicle speed sensor 32 may detect a vehicle speed of the vehicle 1 on the basis of a rotation speed of an unillustrated output shaft of the motor, for example, and output data on the detected vehicle speed to the battery CU 20.

The stereo camera 33 may be so mounted on the vehicle 1 as to face forward. The stereo camera 33 may obtain a stereo image containing distance information, and output data on the obtained stereo image to the battery CU 20. The battery CU 20 may be able to detect, for example, a distance between its own vehicle and a front traveling vehicle from the stereo image.

The ECU 40 may control an operation of each of components that are related to traveling of the vehicle 1. For example, the ECU 40 may control an operation of an unillustrated component such as the motor, an inverter, or a DC-DC converter, in accordance with a depressing amount of an accelerator pedal pressed down by a driver, for example.

Operation of Cooling Apparatus for in-Vehicle Device

A description is given of an operation of the in-vehicle device cooling apparatus 100 when the high-voltage battery 11 is to be cooled upon the traffic congestion of a traveling road of the vehicle 1.

In the example implementation, the battery CU 20 of the in-vehicle device cooling apparatus 100 sets a set cooling amount that causes the cooling fan 12 to operate. The battery CU 20 may set the set cooling amount on the basis of a normal temperature of the ambient temperature of the high-voltage battery 11 and the ambient temperature detected by the battery temperature gauge 31. The battery CU 20 may alternatively set the set cooling amount on the basis of a normal temperature range of the ambient temperature of the high-voltage battery 11 and the ambient temperature detected by the battery temperature gauge 31. Further, the battery CU 20 may adjust a value of the set cooling amount on the basis of a temperature difference between the normal temperature or the normal temperature range and the detected ambient temperature (i.e., a battery temperature), and an elapsed time of a state involving the temperature difference.

For example, in an example case where the battery temperature is higher than the normal temperature or the normal temperature range, the battery CU 20 may gradually make the set cooling amount larger at a predetermined rate of increase. In an example case where the battery temperature is lower than the normal temperature or the normal temperature range, the battery CU 20 may gradually make the set cooling amount smaller at a predetermined rate of decrease.

Figure 2:
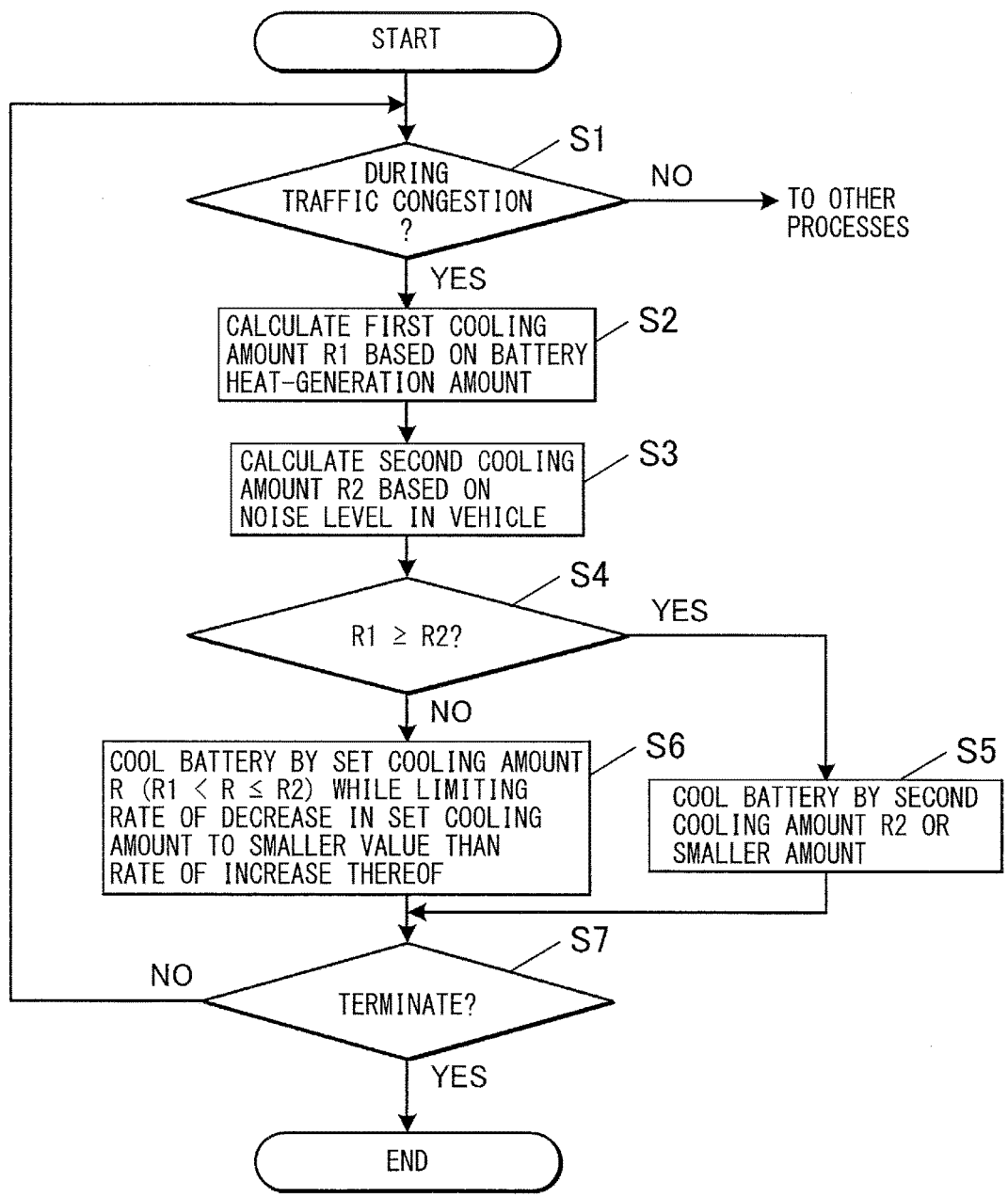
FIG. 2 is a flowchart illustrating one example of a flow of an operation, i.e., a traffic congestion cooling process, when the cooling apparatus for an in-vehicle device according to one implementation cools a high-voltage battery upon traffic congestion of a traveling road.

FIG. 2 is a flowchart illustrating an example of a flow of an operation of the in-vehicle device cooling apparatus 100 in a traffic congestion cooling process.

Referring to FIG. 2, the battery CU 20 may first determine, in accordance with a traveling state of the vehicle 1, whether the traveling road of the vehicle 1 is congested (step S1). In one implementation, the battery CU 20 may serve as a "traffic congestion determining unit".

For example, the battery CU 20 may obtain the vehicle speed data of the vehicle 1 and data on the distance between its own vehicle and the front traveling vehicle, on the basis of the input signals received from the vehicle speed sensor 32 and the stereo camera 33. In a case where it is detected that start and stop of the vehicle 1 at a low vehicle speed are repeated at a predetermined frequency or more on the basis of these vehicle speed data and the data on the distance between its own vehicle and the front traveling vehicle, the battery CU 20 may determine that the traveling road of the vehicle 1 is congested.

Concrete determination criteria in determining the traffic congestion is not particularly limited. For example, in a case where: the predetermined frequency is two or more times of operations of start and stop of the vehicle 1; the vehicle speed upon steady traveling is fixed speed (for example, 10 km/h) or lower; and the distance between its own vehicle and the front traveling vehicle is 10 m or shorter, then the battery CU 20 may determine that the traveling road is congested.

Note that a method of determining the traffic congestion is not limited to the above method, and any of various known methods may be used. For example, the battery CU 20 may determine whether the traveling road of the vehicle 1 is congested by using a service of traffic information based on VICS (Vehicle Information and Communication System: registered trademark). Further, the device that performs the traffic congestion determination may not necessarily be the battery CU 20. In an alternative implementation, the ECU (Electronic Control Unit) 40 may perform the traffic congestion determination, and the battery CU 20 may obtain a determination result thereof. In other words, the configuration that performs the traffic congestion determination may be provided integrally with the battery CU 20, or may be provided separately from the battery CU 20. In a yet alternative implementation, the ECU 40 may execute one or more of the following steps S1 to S7 in place of the battery CU 20.

In a case where it is determined that the traveling road of the vehicle 1 is not congested in step S1, i.e., the vehicle 1 normally travels (step S1: NO), the battery CU 20 may cause the processing flow to proceed to other processes. For example, the battery CU 20 may cause the cooling fan 12 to cool the high-voltage battery 11 by a later-described first cooling amount R1.

In a case where it is determined that the traveling road of the vehicle 1 is congested in step S1 (step S1: YES), the battery CU 20 may calculate the first cooling amount R1 that is based on a heat-generation amount of the high-voltage battery 11 (step S2). In one implementation, the battery CU 20 may serve as a "cooling amount calculator".

For example, the battery CU 20 may obtain the data on the ambient temperature of the high-voltage battery 11 detected by the battery temperature gauge 31. Further, the battery CU 20 may calculate the first cooling amount R1 (see FIG. 3) that allows for lowering of the ambient temperature to the normal temperature range. In other words, the battery CU 20 may calculate the first cooling amount R1 that allows the ambient temperature to be maintained in the normal temperature range. Note that a method of calculating the first cooling amount R1 and/or any other factor related to the first cooling amount R1 is not particularly limited so long as the method and/or the factor is based on the heat-generation amount of the high-voltage battery 11. For example, the battery CU 20 may estimate the heat-generation amount of the high-voltage battery 11 on the basis of a factor such as an amount of current of charge and discharge of the high-voltage battery 11 or an integrated value thereof, without obtaining the data on the ambient temperature of the high-voltage battery 11 from the battery temperature gauge 31.

Next, the battery CU 20 may calculate a second cooling amount R2 that is based on a noise level inside the vehicle 1 (step S3).

For example, the battery CU 20 may estimate the noise level in the vehicle 1 on the basis of a factor such as the vehicle speed data obtained by the vehicle speed sensor 32. The vehicle speed data may include data on an engine rotation speed and/or any other data in a case where the vehicle 1 is the HEV. Thereafter, the battery CU 20 may calculate, on the basis of the estimated noise level, the second cooling amount R2 (see FIG. 3) that is based on a maximum rotation speed of the cooling fan 12. Note that the maximum rotation speed of the cooling fan 12 here may fall within a range of the noise level that does not give a sense of discomfort to an occupant. In other words, the maximum rotation speed of the cooling fan 12 here may fall within a range of the noise level that is less noticeable or unnoticeable by the occupant.

In an alternative implementation, a sensor such as a sound sensor or a vibration sensor may be provided in the vehicle 1 to directly detect the noise level in the vehicle 1 without estimating the noise level in the vehicle 1 by the battery CU 20.

Thereafter, the battery CU 20 may determine whether the first cooling amount R1 is equal to or more than the second cooling amount R2 (step S4).

In a case where it is determined that the first cooling amount R1 is equal to or more than the second cooling amount R2 (step S4: YES), in the example implementation, the battery CU 20 may so control an output of the cooling fan 12, i.e., may so operate the cooling fan 12, that the high-voltage battery 11 is cooled by the second cooling amount R2 as the set cooling amount, in order to keep quietness in the vehicle 1 (step S5). In this case, so long as it is possible to cool the ambient temperature of the high-voltage battery 11, the battery CU 20 may control the cooling fan 12 to cool the high-voltage battery 11 by the set cooling amount that is equal to or smaller than the second cooling amount R2.

In a case where it is determined that the first cooling amount R1 is smaller than the second cooling amount R2 (step S4: NO), the battery CU 20 may so control the output of the cooling fan 12, i.e., may so operate the cooling fan 12, as to cool the high-voltage battery 11 by the set cooling amount that is larger than the first cooling amount R1 and equal to or smaller than the second cooling amount R2 (step S6).

Figure 4:
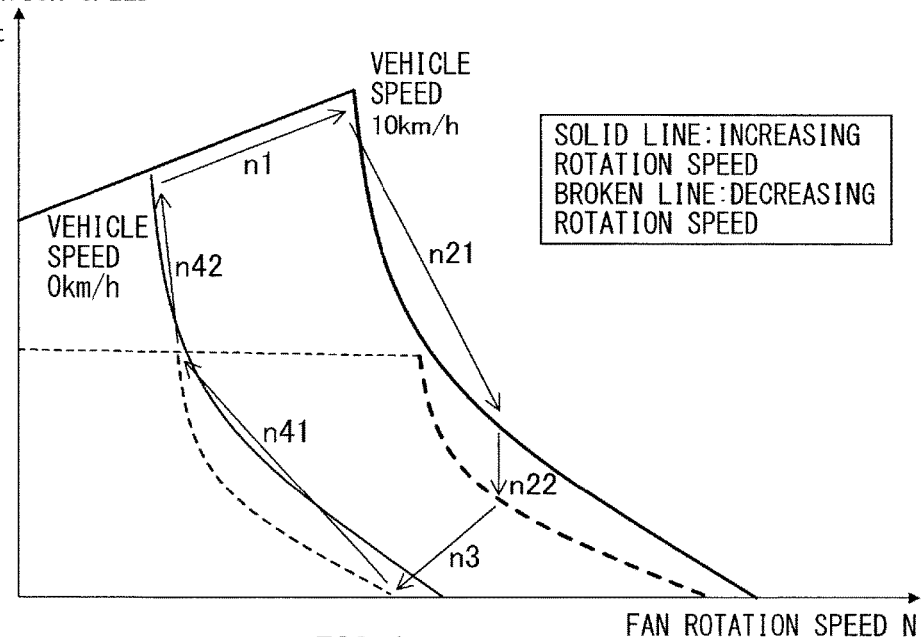
FIG. 4 is a view illustrating one example of a relationship among a fan rotation speed of a cooling fan, a change rate thereof, and the vehicle speed when the cooling apparatus for an in-vehicle device according to one implementation cools the high-voltage battery upon the traffic congestion.

In this case, the battery CU 20 may also limit a rate of decrease in the set cooling amount to be smaller in value than a rate of increase thereof, regardless of the ambient temperature of the high-voltage battery 11 and/or an appropriate temperature. The rate of decrease may be, in other words, a rate of change in the set cooling amount upon decreasing the set cooling amount with an elapse of time. The rate of increase may be, in other words, a rate of change in the set cooling amount upon increasing the set cooling with an elapse of time. For example, to limit the rate of change of the set cooling amount as illustrated in FIG. 4, the battery CU 20 may so control the cooling fan 12 as to cause the rate of change in the rotation speed of the cooling fan 12 upon decreasing the rotation speed thereof to become smaller than the rate of change upon increasing the rotation speed thereof.

Accordingly, in the example implementation, when the vehicle 1 travels upon the traffic congestion of the traveling road, the high-voltage battery 11 is cooled by the set cooling amount that is equal to or smaller than the second cooling amount R2 by which the noise generated by the cooling fan 12 does not give a sense of discomfort to the occupant, regardless of which is larger between the first cooling amount R1 and the second cooling amount R2.

In this regard, in a case where the first cooling amount R1 is smaller than the second cooling amount R2, the first cooling amount R1 suffices as a cooling capacity in order to address a state of heat generation of the high-voltage battery 11. However, in the example implementation, the high-voltage battery 11 is cooled slightly excessively owing to the set cooling amount that falls within a range defined by the second cooling amount R2 or a cooling amount smaller than the second cooling amount R2, in which the noise generated by the cooling fan 12 is less problematic or causes no problem. This makes it possible to promote in advance cooling of the high-voltage battery 11 when the heat-generation amount of the high-voltage battery 11 is not very large. Hence, it is possible to increase the occurrence of a situation and/or a period of time in which the first cooling amount R1 becomes smaller than the second cooling amount R2, i.e., it is possible to increase the occurrence of a situation and/or a period of time in which a priority is given to suppression of the noise over the lowering of the temperature, thereby making it possible to further enhance quietness in the vehicle 1.

Further, in the example implementation, in a case where the high-voltage battery 11 is to be cooled by the set cooling amount that is larger than the first cooling amount R1 and equal to or smaller than the second cooling amount R2, the rate of decrease in the set cooling amount is limited to be smaller in value than the rate of increase in the set cooling amount, making it easier for the set cooling amount to be increased but making it difficult for the set fooling amount to be decreased.

Next, the battery CU 20 may determine whether the traffic congestion cooling process for the high-voltage battery 11 is to be terminated (step S7). In a case where it is determined that the traffic congestion cooling process is not to be terminated (step S7: NO), the battery CU 20 may cause the processing flow to proceed to step S1 described above.

In a case where it is determined that the traffic congestion cooling process for the high-voltage battery 11 is to be terminated (step S7: YES), the battery CU 20 may terminate the traffic congestion cooling process. For example, the determination that the traffic congestion cooling process is to be terminated may be made in response to a termination operation performed by a driver.

Operation Example of Cooling Apparatus for in-Vehicle Device

A description is given, with reference to a specific but non-limiting example, of an operation of the in-vehicle device cooling apparatus 100 described above. Here, a description is given of an example of cooling of the high-voltage battery 11 where the vehicle 1 repeats the start and the stop between a stop state and a low-speed traveling state as the traveling state of the vehicle 1 upon the traffic congestion. For example, the stop state may be a state in which the vehicle speed is 0 km/h, and the low-speed traveling state may be a state in which the vehicle speed is 10 km/h or slower.

Figure 3:
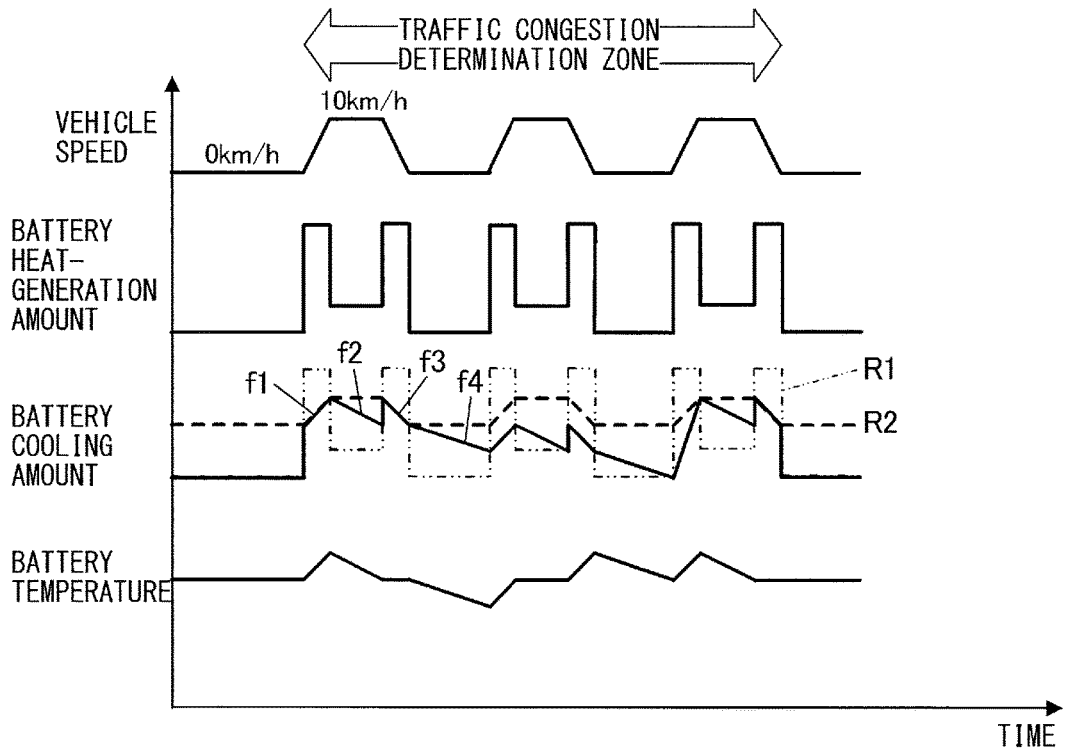
FIG. 3 is a view illustrating one example of a timing chart of a vehicle speed, a battery heat-generation amount, a battery cooling amount, and a battery temperature when the cooling apparatus for an in-vehicle device according to one implementation cools the high-voltage battery upon the traffic congestion.

FIG. 3 illustrates one example of a timing chart of a vehicle speed, a battery heat-generation amount, a battery cooling amount, and the battery temperature upon the traffic congestion of the traveling road. FIG. 4 illustrates one example of a relationship between a fan rotation speed N of the cooling fan 12 and a change rate thereof upon the traffic congestion of the traveling road. Note that, for easier description, the first cooling amount R1 illustrated in FIG. 3 is not a precise value but is a rough or approximate value.

Referring to FIG. 3 and FIG. 4, first, upon acceleration of the vehicle 1, the battery CU 20 may increase the output of the cooling fan 12 in accordance with an increase in the heat-generation amount of the high-voltage battery 11 which is based on the acceleration of the vehicle 1, thereby increasing the set cooling amount for the high-voltage battery 11.

Here, in this example, the first cooling amount R1 is larger than the second cooling amount R2. Accordingly, the battery CU 20 may maintain the set cooling amount for the high-voltage battery 11 to the second cooling amount R2 that becomes larger with the acceleration of the vehicle 1 (denoted by "f1" in FIG. 3). For example, the battery CU 20 may increase the fan rotation speed N while gradually increasing the rate of change in the fan rotation speed N of the cooling fan 12 to thereby increase the set cooling amount (denoted by "n1" in FIG. 4).

It is to be noted that, upon this acceleration, the high-voltage battery 11 is cooled simply by the second cooling amount R2 that is smaller than the first cooling amount R1. The first cooling amount R1 may be a cooling amount required for sufficient cooling. This means that the ambient temperature of the high-voltage battery 11 (i.e., the battery temperature) rises slightly.

Next, upon the steady traveling of the vehicle 1 in which the vehicle speed is about 10 km/h without limitation, the heat-generation amount of the high-voltage battery 11 is lowered as compared with that upon the acceleration, and the first cooling amount R1 becomes smaller than the second cooling amount R2. Accordingly, the battery CU 20 may control the cooling fan 12 to cool the high-voltage battery 11 by the set cooling amount that is larger than the first cooling amount R1 and equal to or smaller than the second cooling amount R2 (denoted by "f2" in FIG. 3).

Under such circumstances, the first cooling amount R1 suffices as the cooling capacity in order to address the state of heat generation of the high-voltage battery 11. However, in the example implementation, the high-voltage battery 11 is cooled slightly excessively owing to the set cooling amount that falls within a range defined by the second cooling amount R2 or a cooling amount smaller than the second cooling amount R2 in which the noise generated by the cooling fan 12 is less problematic or causes no problem. Thus, in the example implementation, the set cooling amount for the high-voltage battery 11 is gradually lowered in accordance with an elapsed time that is based on the lowering of the heat-generation amount, making it possible to prevent excessive, unnecessary cooling of the high-voltage battery 11.

Further, at this time, the battery CU 20 limits the rate of decrease in the set cooling amount to be smaller in value than the rate of increase to thereby gradually decrease the set cooling amount. For example, the battery CU 20 may limit the rate of decrease in the set cooling amount to be smaller than a rate of increase in the set cooling amount upon the acceleration. Thus, the set cooling amount for the high-voltage battery 11 is gradually lowered in accordance with the ambient temperature (e.g., the battery temperature) of the high-voltage battery 11. This makes it possible to suppress the excessive fall in the ambient temperature of the high-voltage battery 11. Hence, it is possible to suppress fluctuation in the ambient temperature.

Upon the steady traveling, quietness of the vehicle 1 is increased as compared with that upon the acceleration, making a noise generated by the cooling fan 12 more noticeable. Accordingly, the battery CU 20 may increase the fan rotation speed N while gradually decreasing the rate of change of the fan rotation speed N (denoted by "n21" in FIG. 4). Thereafter, when the fan rotation speed N reaches a predetermined value that is based on the set cooling amount, the battery CU 20 may substantially maintain this fan rotation speed (denoted by "n22" in FIG. 4).

Here, the noise generated by the cooling fan 12, such as the wind noise, tends to become large upon the change in the fan rotation speed N. Accordingly, when increasing the fan rotation speed N, the rate of change may gradually be decreased with the increase in the fan rotation speed N. In other words, when making a transition from a state in which the noise is relatively small to a state in which the noise is large, the rate of change may gradually be decreased with the increase in the fan rotation speed N.

Next, upon deceleration of the vehicle 1, the battery CU 20 may increase the output of the cooling fan 12 in accordance with the increase in the heat-generation amount of the high-voltage battery 11.

In this case, the first cooling amount R1 becomes larger than the second cooling amount R2 as with the acceleration. Accordingly, the battery CU 20 may maintain the set cooling amount for the high-voltage battery 11 to the second cooling amount R2 that is gradually decreased with the decrease in the speed of the vehicle 1 (denoted by "f3" in FIG. 3). For example, when decreasing the fan rotation speed N, the battery CU 20 may decrease the fan rotation speed N while decreasing the rate of change in the fan rotation speed N of the cooling fan 12 moderately as compared with the change of rate in the fan rotation speed N upon increasing the fan rotation speed N (denoted by "n3" in FIG. 4).

Next, upon the stop of the vehicle 1, the first cooling amount R1 becomes smaller than the second cooling amount R2 as with the steady traveling. Accordingly, the battery CU 20 may control the cooling fan 12 to cool the high-voltage battery 11 by the set cooling amount that is larger than the first cooling amount R1 and equal to or smaller than the second cooling amount R2 (denoted by "f4" in FIG. 3).

Note that the first cooling amount R1 suffices as the cooling capacity in order to address the state of heat generation of the high-voltage battery 11. However, in the example implementation, the high-voltage battery 11 is cooled slightly excessively owing to the set cooling amount that falls within the range defined by the second cooling amount R2 or the cooling amount smaller than the second cooling amount R2 in which the noise generated by the cooling fan 12 is less problematic or causes no problem. Thus, in the example implementation, the set cooling amount for the high-voltage battery 11 is gradually lowered in accordance with the elapsed time that is based on the lowering of the heat-generation amount. Hence, it is possible to prevent the excessive, unnecessary cooling of the high-voltage battery 11.

Further, at this time, the battery CU 20 limits the rate of decrease in the set cooling amount to be smaller in value than the rate of increase (e.g., the rate of increase in the set cooling amount upon the acceleration) to thereby gradually decrease the set cooling amount as with the steady traveling. Thus, the set cooling amount for the high-voltage battery 11 is gradually lowered in accordance with the ambient temperature of the high-voltage battery 11. Hence, it is possible to suppress the excessive fall in the ambient temperature of the high-voltage battery 11 and to suppress fluctuation in the ambient temperature accordingly.

Upon the stop state, the battery CU 20 may decrease the fan rotation speed N while increasing the rate of change in the fan rotation speed N moderately as compared with the rate of change in the fan rotation speed N upon increasing the fan rotation speed N (denoted by "n41" in FIG. 4). Thereafter, when the fan rotation speed N reaches a predetermined value that is based on the set cooling amount, the battery CU 20 may substantially maintain this fan rotation speed (denoted by "n42" in FIG. 4).

The noise generated by the cooling fan 12 tends to become large upon the change in the fan rotation speed N. Accordingly, when decreasing the fan rotation speed N, i.e., when making a transition from a state in which the noise is relatively large to a state in which the noise is small, the rate of change may gradually be increased with the decrease in the fan rotation speed N, without causing the fan rotation speed N to be decreased rapidly and suddenly by a large rate of change.

Thereafter, in the vehicle 1, the cooling of the high-voltage battery 11 upon the acceleration, the steady traveling, the deceleration, and the stop of the vehicle 1 described above may be repeated in turn so long as it is determined that the traveling road is congested.

Example Effects

According to the in-vehicle device cooling apparatus 100 of the foregoing example implementation, when the traveling road is determined as being congested and the first cooling amount R1 that is based on the heat-generation amount of the high-voltage battery 11 is smaller than the second cooling amount R2 that is based on the noise level in the vehicle 1, the high-voltage battery 11 is cooled by the set cooling amount that is larger than the first cooling amount R1 and equal to or smaller than the second cooling amount R2. Thus, while keeping quietness in the vehicle 1, the high-voltage battery 11 is slightly excessively cooled by the set cooling amount that is larger than the first cooling amount R1. The first cooling amount R1 is based on the heat-generation amount of the high-voltage battery 11. Hence, it is possible to promote in advance the cooling of the high-voltage battery 11 when the heat-generation amount of the high-voltage battery 11 is not very large.

Further, in the example implementation, the battery CU 20 controls the cooling fan 12 to cool the high-voltage battery 11 by the set cooling amount that is larger than the first cooling amount R1 and equal to or smaller than the second cooling amount R2, while limiting the rate of decrease in the set cooling amount to be smaller than the rate of increase thereof. Hence, it is possible to ensure a necessary cooling amount easily on the basis of the state of heat generation of the high-voltage battery 11. In addition, it is possible to suppress the fluctuation of the set cooling amount, making it possible to improve quietness in the vehicle 1.

Therefore, it is possible to suitably cool the high-voltage battery 11 upon the traffic congestion while keeping quietness in the vehicle 1.

Modification Example

Although some implementations of the technology have been described in the foregoing with reference to the accompanying drawings, the technology is by no means limited to the implementations described above.

For example, in the foregoing example implementation, the cooling fan 12 serves as the cooler that cools the high-voltage battery 11. However, the cooler according to any implementation of the technology is not limited to the cooling fan so long as the cooler generates an operating noise with loudness that is based on an output thereof. For example, the cooler may be a water pump, or any other device that allows for cooling of the high-voltage battery 11.

Further, the in-vehicle device, such as the heat-generating device, as a target to be cooled by the cooling fan 12 is not limited to the high-voltage battery 11. For example, the heat-generating device may be any device that involves an increase in load upon the acceleration and the deceleration of the vehicle 1 during the traffic congestion, such as a motor, an inverter, or a DC-DC converter.

Further, the in-vehicle device cooling apparatus 100 may estimate, or predict, a future load on the high-voltage battery 11. Further, on the basis of the estimated or predicted future load, the in-vehicle device cooling apparatus 100 may adjust the cooling intensity. For example, as the adjustment, the in-vehicle device cooling apparatus 100 may increase a time period of cooling the high-voltage battery 11 by the set cooling amount that is larger than the first cooling amount R1, and/or may cause the set cooling amount to approach the second cooling amount R2.

In such an example implementation, the load on the high-voltage battery 11 may be estimated on the basis of: a current traveling mode of the vehicle 1, such as whether the traveling mode is an EV mode, or an HEV mode; remaining SOC (State Of Charge); and/or the degree of usage of auxiliary machines of the vehicle 1, such as turning on a headlight at night.

The battery CU 20 and/or the ECU 40 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the battery CU 20 and/or the ECU 40. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the battery CU 20 and/or the ECU 40 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A cooling apparatus for an in-vehicle device comprising:
   a cooler configured to generate an operating noise with loudness that is based on an output of the cooler, and cool a heat-generating device mounted on a vehicle;
   a traffic congestion determining unit configured to determine, on a basis of a traveling state of the vehicle, whether a traveling road on which the vehicle travels is congested;
   a cooling amount calculator configured to calculate a first cooling amount and a second cooling amount, the first cooling amount being based on a heat-generation amount of the heat-generating device, the second cooling amount being based on a noise level inside the vehicle; and
   a cooler controller configured to control an operation of the cooler on a basis of a set cooling amount, the cooler controller being configured to control the cooler to cool the heat-generating device on a basis of the set cooling amount that is larger than the first cooling amount and equal to or smaller than the second cooling amount and limit a rate of decrease in the set cooling amount to be smaller than a rate of increase in the set cooling amount, on a condition that the traveling road is determined by the traffic congestion determining unit as being congested and the first cooling amount is smaller than the second cooling amount.

2. The cooling apparatus for an in-vehicle device according to claim 1, wherein, on a condition that the traveling road is determined by the traffic congestion determining unit as being congested and the first cooling amount is smaller than the second cooling amount, the cooler controller gradually decreases the set cooling amount on a basis of an elapsed time of a state in which the traveling road is determined as being congested and the first cooling amount is smaller than the second cooling amount.

3. The cooling apparatus for an in-vehicle device according to claim 1, wherein the cooler controller controls the cooler to cool the heat-generating device on a basis of the second cooling amount or a cooling amount that is smaller than the second cooling amount, on a condition that the traveling road is determined by the traffic congestion determining unit as being congested and the first cooling amount is equal to or more than the second cooling amount.

4. The cooling apparatus for an in-vehicle device according to claim 1, wherein the second cooling amount comprises a heat-generating device cooling amount that is directed to cooling of the heat-generating device and based on a maximum rotation speed of the cooler, the maximum rotation speed of the cooler falling within a range of the noise level that does not give a sense of discomfort to an occupant of the vehicle.

5. The cooling apparatus for an in-vehicle device according to claim 1, wherein
the cooler comprises a cooling fan, and
the cooler controller controls the cooling fan to cause a rate of change in a rotation speed of the cooling fan upon decreasing the rotation speed to be smaller than a rate of change in the rotation speed upon increasing the rotation speed.

6. The cooling apparatus for an in-vehicle device according to claim 1, wherein
the vehicle comprises an electric vehicle, and
the heat-generating device comprises a high-voltage battery configured to store electric power directed to traveling of the electric vehicle.

7. A cooling apparatus for an in-vehicle device comprising:
a cooler that generates an operating noise with loudness that is based on an output of the cooler, and cools a heat-generating device mounted on a vehicle; and
circuitry configured to
determine, on a basis of a traveling state of the vehicle, whether a traveling road on which the vehicle travels is congested,
calculate a first cooling amount and a second cooling amount, the first cooling amount being based on a heat-generation amount of the heat-generating device, the second cooling amount being based on a noise level inside the vehicle,
control an operation of the cooler on a basis of a set cooling amount,
control the cooler to cool the heat-generating device on a basis of the set cooling amount that is larger than the first cooling amount and equal to or smaller than the second cooling amount, on a condition that the traveling road is determined as being congested and the first cooling amount is smaller than the second cooling amount, and
limit a rate of decrease in the set cooling amount to be smaller than a rate of increase in the set cooling amount, on the condition that the traveling road is determined as being congested and the first cooling amount is smaller than the second cooling amount.

8. The cooling apparatus for an in-vehicle device according to claim 2, wherein the cooler controller controls the cooler to cool the heat-generating device on a basis of the second cooling amount or a cooling amount that is smaller than the second cooling amount, on a condition that the traveling road is determined by the traffic congestion determining unit as being congested and the first cooling amount is equal to or more than the second cooling amount.

9. The cooling apparatus for an in-vehicle device according to claim 2, wherein the second cooling amount comprises a heat-generating device cooling amount that is directed to cooling of the heat-generating device and based on a maximum rotation speed of the cooler, the maximum rotation speed of the cooler falling within a range of the noise level that does not give a sense of discomfort to an occupant of the vehicle.

10. The cooling apparatus for an in-vehicle device according to claim 3, wherein the second cooling amount comprises a heat-generating device cooling amount that is directed to cooling of the heat-generating device and based on a maximum rotation speed of the cooler, the maximum rotation speed of the cooler falling within a range of the noise level that does not give a sense of discomfort to an occupant of the vehicle.

11. The cooling apparatus for an in-vehicle device according to claim 8, wherein the second cooling amount comprises a heat-generating device cooling amount that is directed to cooling of the heat-generating device and based on a maximum rotation speed of the cooler, the maximum rotation speed of the cooler falling within a range of the noise level that does not give a sense of discomfort to an occupant of the vehicle.

12. The cooling apparatus for an in-vehicle device according to claim 2, wherein
the cooler comprises a cooling fan, and
the cooler controller controls the cooling fan to cause a rate of change in a rotation speed of the cooling fan upon decreasing the rotation speed to be smaller than a rate of change in the rotation speed upon increasing the rotation speed.

13. The cooling apparatus for an in-vehicle device according to claim 3, wherein
the cooler comprises a cooling fan, and
the cooler controller controls the cooling fan to cause a rate of change in a rotation speed of the cooling fan upon decreasing the rotation speed to be smaller than a rate of change in the rotation speed upon increasing the rotation speed.

14. The cooling apparatus for an in-vehicle device according to claim 8, wherein
the cooler comprises a cooling fan, and
the cooler controller controls the cooling fan to cause a rate of change in a rotation speed of the cooling fan upon decreasing the rotation speed to be smaller than a rate of change in the rotation speed upon increasing the rotation speed.

15. The cooling apparatus for an in-vehicle device according to claim 2, wherein
the vehicle comprises an electric vehicle, and
the heat-generating device comprises a high-voltage battery configured to store electric power directed to traveling of the electric vehicle.

16. The cooling apparatus for an in-vehicle device according to claim 3, wherein
the vehicle comprises an electric vehicle, and
the heat-generating device comprises a high-voltage battery configured to store electric power directed to traveling of the electric vehicle.

17. The cooling apparatus for an in-vehicle device according to claim 8, wherein
the vehicle comprises an electric vehicle, and
the heat-generating device comprises a high-voltage battery configured to store electric power directed to traveling of the electric vehicle.

* * * * *